United States Patent [19]

Dennis

[11] 4,067,656

[45] Jan. 10, 1978

[54] JOINT MEMBER

[76] Inventor: Edward F. Dennis, P.O. Box 339, Danville, Quebec, Canada

[21] Appl. No.: 624,002

[22] Filed: Oct. 20, 1975

[51] Int. Cl.² .............................................. F16B 7/18
[52] U.S. Cl. ................................... 403/296; 403/343; 211/182; 85/1 R
[58] Field of Search ........ 403/231, 292, 296, 169–178, 403/7, 342, 343; 211/182; 85/37, 39, 1 R

[56] References Cited

U.S. PATENT DOCUMENTS

| 115,214 | 5/1871 | Jones | 52/753 E |
|---|---|---|---|
| 1,979,686 | 11/1934 | Hall et al. | 85/37 X |
| 2,026,167 | 12/1935 | Guarnaschelli | 403/296 X |
| 2,720,405 | 10/1955 | Kennedy | 403/292 X |
| 2,868,602 | 1/1959 | Drezner | 403/292 X |
| 3,129,472 | 4/1964 | Hensel | 403/231 X |
| 3,531,903 | 10/1970 | Swanson | 85/37 X |

FOREIGN PATENT DOCUMENTS

| 901,012 | 5/1936 | France | 52/753 D |
|---|---|---|---|
| 17,588 of | 1906 | United Kingdom | 403/292 |

*Primary Examiner*—Wayne L. Shedd
*Attorney, Agent, or Firm*—Stevens, Davis, Miller & Mosher

[57] ABSTRACT

A threaded joint member for connecting two sections of a decorative pole assembly, of knock-down type furniture or the like has a sleeve with an outer thread adapted to be received in an inner thread at the end of one section of the assembly. The sleeve is secured to another section of the assembly so that a limited pivotal movement of the sleeve can be effected on applying an extreme force in the same direction as that in which the two sections have to be turned relative to each other to establish a strong abutment connection between same. The invention thus provides for a simple alignment of the surfaces of the two adjacent sections by partly turning one with respect to the other, without decreasing the strength of the connection.

4 Claims, 10 Drawing Figures

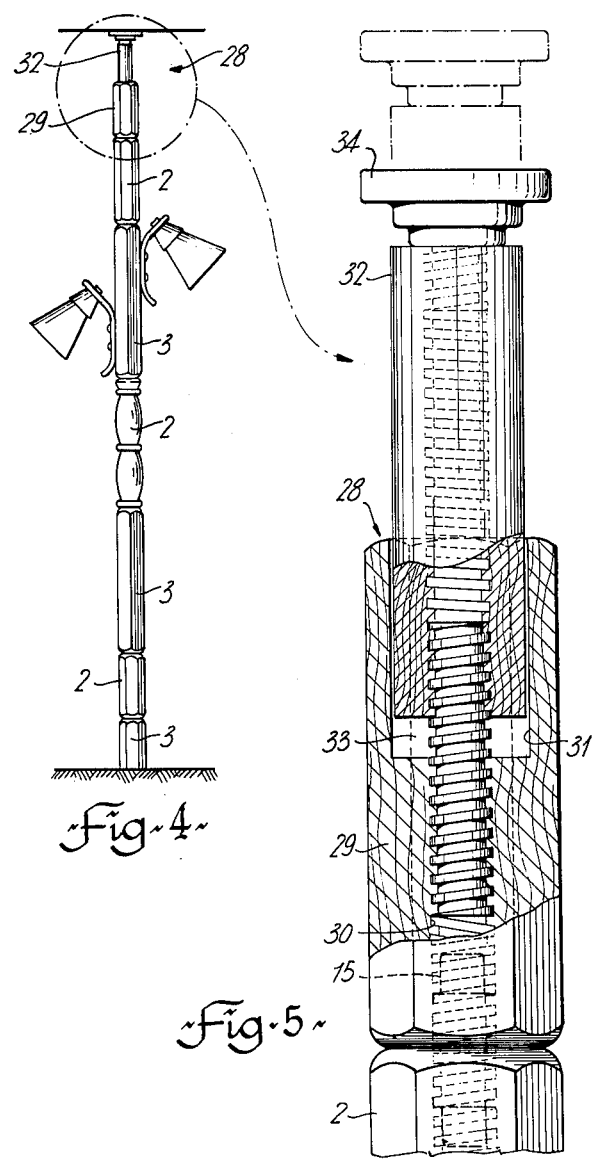

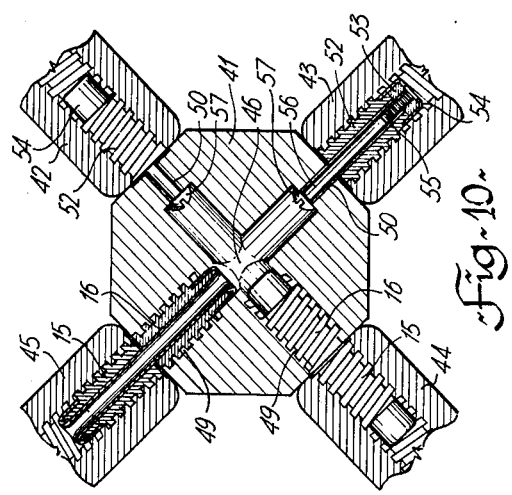
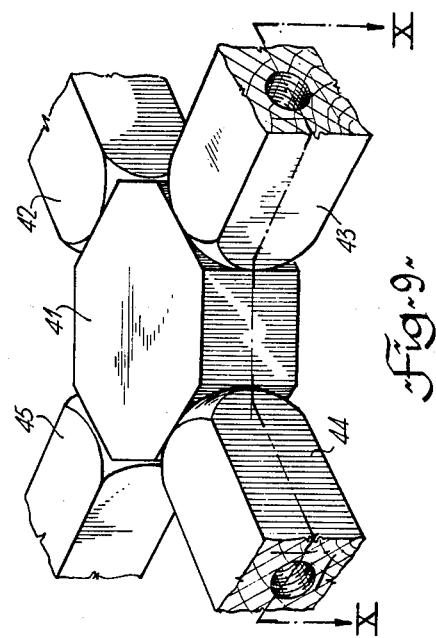

JOINT MEMBER

The present invention relates to a threaded joint member for providing a tight abutment connection of two objects such as two pieces of a K-D(knock down) type furniture assembly, decorative pole assembly or the like.

An example of the field of application of the present invention can be found in U.S. Pat. No. 3,437,059, issued to R. W. Stoner et al. on Apr. 8, 1969. Another example of the application of the present invention is my Canadian Pat. No. 969,908, issued June 24, 1975 and referring to a lamp pole assembly. It will be appreciated that the field of application of the present invention is not limited to the above two examples.

In the above art, the most usual way of connecting two members is the use of a spring member introduced between abutting ends of two connected pieces, such as shown in the above mentioned U.S. patent, the drawback of such joint being in its failure to provide a rigid enough assembly for practical purposes. The rigidity of the joint shown in my Canadian Pat. No. 969,908 is improved by replacement of the spring members with a rigid wooden threaded connector which is screwed into end recesses of the abutting pieces to form a lamp stand or the like. However, the latter type of joint is almost impossible to use when the abutted pieces are of square, rectangular or polygonal cross section as in such cases it is vital that the surface planes of one such polygonal piece be parallel with their respective counter-planes on the surface of the other abutting piece. Therefore, the joint employed in this type of assemblies of furniture or the like has thus far been either a glued dowel joint such as the one disclosed in U.S. Pat. No. 3,405,592 issued Oct. 15, 1968, or a relatively complex screw-type joint of the kind disclosed in Canadian Pat. No. 786,010 issued on May 28, 1968 and employing a deformable insert member associated with a threaded member, which, in turn, is actuated by a special key to expand the insert member in establishing a connection between two tubular pieces.

It is an object of the present invention to overcome the above drawbacks and to provide a simple and thus relatively inexpensive joint member which requires minimum skill in use and which provides the possibility of an easy adjustment of mutual position between the two abutting members after the two have been joined together, to bring their planar surface portions into alignment.

According to the present invention a threaded joint member is provided for establishing a tight, unglued, threaded, abutment connection of two objects by turning at least one of said objects about the axis of said joint member. The joint member comprises at least one generally cylindrical sleeve the outer surface of which is provided with a thread. The thread is adapted to be received in an inner thread provided in at least one of said two objects. A further part of the threaded joint is a shank means adapted to be secured to the other of said two objects and to assume, prior to the application of said at least one of said two objects, a position coaxial with said sleeve and inside same, whereby the sleeve is pivotal about the shank means. The shank means further comprises frictional retaining means arranged to resist the pivotal movement of said sleeve about said shank means to thus render a first force required for imparting pivotal movement of said sleeve with respect to the shank means to be equal to or greater than the maximum of a second force required for turning one of said objects relative to the other to achieve a tightened state of said joint. Thus, the two objects can be turned relative to each other in the direction of tightening of the joint, even after having assumed said tight abutment connection, to bring the surface planes of respective portions joined together into an alignment.

Another feature of the present invention provides for a joint member having two generally cylindrical sleeves, the outer surfaces of which are provided with a thread, the thread being adapted to be received in an inner thread in each of said two objects. The sleeves are pivotally secured to shank means passing therethrough and prevented from axial displacement with respect to the shank means, whereby the sleeves are coaxial with respect to each other and pivotal about said shank means. Retaining means are associated with said shank means and with said sleeves for resisting said pivotal movement of the sleeves with respect to the shank means and thus also with respect to each other. Consequently, the sleeves can be turned with respect to each other only on application of an extreme force.

Thus, the present invention, when applied to a K-D type furniture provides an element of a knock-down type furniture, said element comprising a first part and a second part which are to be connected to each other, each of said parts having at least one generally planar end surface, each of said planar end surfaces having an internally threaded bore perpendicular to said end surface. A joint member comprising two generally cylindrical sleeves with threaded surface, the threads of respective sleeves corresponding to the threads of said first and said second parts, respectively. The sleeves are pivotally secured to shank means and the shank means is arranged to axially press the sleeves to each other to resist pivotal movement of said sleeves about said stem means. Consequently, the joint member is arranged to be screwed into the end of one of said two parts with one of said sleeves engaging the internal thread thereof, with the second sleeve protruding from the end surface of said one of the parts, whereupon the second part can be screwed upon the protruding sleeve until a firm abutment joint is established between the two members, said joint member allowing for further turning of the parts with respect to each other in the direction of tightening the joint after having established a firm abutment joint between same, on overcoming the resistance to said pivotal movement of the sleeves about the shank means.

A still further development of the present invention results in a new and useful decorative pole assembly which comprises a threaded joint assembly as referred to hereinbefore. The pole assembly further includes an end stud assembly which comprises an elongated female member and a male member arranged to be received in one end portion of said female member, the opposite end portion of the female member being provided with an opening having an inner thread adapted to receive one end of said joint member. A threaded stud is arranged to protrude centrally longitudinally from said opposite end of said female member towards said one end of said female member. One end of the threaded stud is adapted to be received within the inner thread of said one end portion, the other end of said threaded stud is adapted to be received within an inner thread extending coaxially with and provided in said male member, whereby the overall axial length of said end stud assembly can be adjusted by turning the male member relative to the threaded stud.

Several embodiments of the present invention will now be described in greater detail with reference to the accompanying drawings in which FIG. 1 is a partial perspective view, partly in section, showing a K-D coffee table top and a part of one leg thereof, as assembled, with two different types of the joint of the present invention being shown in this particular figure;

FIG. 4 is a perspective side view of a decorative lamp pole;

FIG. 5 is a partial section of the top portion of the pole of FIG. 4;

FIG. 9 is a perspective view of another type of a cross-piece of a knock-down furniture with the cross-piece being shown as connected to further elements of the furniture by use of joint members of the present invention; and FIG. 10 is section X—X of FIG. 9.

Figure 1:
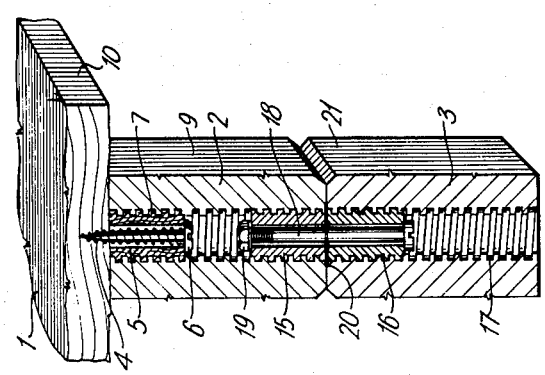

Turning now to FIG. 1, a corner portion of a coffee table is shown including a flat top 1 and a portion of a leg consisting of a plurality of leg sections 2, 3. It will be observed that the objects 1 and 2 have to be in a tight abutment connection with each other. Similarly, the objects 2 and 3 are joined with each other in a tight, abutment manner, without the use of a glue.

Secured to the top 1 by means of a screw 4 is a cylindrical sleeve 5 which is made of hardwood. The sleeve 5 is secured to the top 1 solely by axial pressure exerted by the head 6 acting on the sleeve 5 through a washer (not shown). It will be appreciated that without the use of a glue, the sleeve 5 can be turned about the shank portion of the screw 4 even on tight securing of the sleeve to the top 1, providing that sufficient force is exerted on sleeve 5 to overcome the frictional axial force of the screw head 4, holding the sleeve 5 in place.

The outer surface of sleeve 5 is provided with a power transmission type screw thread 7, the thread 7 being of the same size as the inner thread 8 machined in a central, axially extending bore of the leg section 2. In other words, the sleeve 5 has its outer surface provided with a thread 7, said thread 7 being adapted to be received in an inner thread 8 provided in one of said two objects 1, 2.

When assembling the furniture together, the sleeve 5 is first secured to the top 1 by the wood screw 4, whereupon the section 2 may be screwed onto the sleeve 5 until the section 2 abuts against the bottom face of the top 1.

If the leg section 2 is of a rectangular cross section as shown in FIG. 1, it is vital from the standpoint of appearance of the final assembled product that the side wall 9 of the section 2 be parallel with the side edge 10 of the top 1. Such mutual arrangement of the surfaces 9, 10 may be difficult in view of the fact that the joint between the top 1 and the section 2 is a threaded joint which is established by turning the section 2 about the sleeve 5, until abutment relationship between the objects 1, 2 is established. However, due to the arrangement of the present invention, even if such abutment connection is established with surface 9 out of alignment with the edge 10, the object 2 can still be turned in the direction of tightening, until the two surfaces 9, 10 are aligned, without impairing the strength of the abutment joint between the leg section 2 and the bottom surface of the top 1.

It will be appreciated from the above that the wood screw 4 of FIG. 1 can thus be referred to as shank means which assumes, on fixing of the sleeve 5 to the table 1, a position coaxial with said sleeve 5 and inside same, whereby the sleeve 5 is pivotal about the shank means 4, on overcoming the friction caused by the above-mentioned axial force. It will further be appreciated that the wood screw 4 acts in this association as retaining means for resisting the pivotal movement of the sleeve 5 about the wood screw 4 to thus render a first force required for imparting pivotal movement of sleeve 5 with respect to the shank means or screw 4 to be equal to or greater than the maximum of a second force required for turning the leg section 2 to achieve the tightened state of said joint. In other words, the tightness of the abutment joints between the section 2, 1 depends on the axial force exerted by the screw 4 relative to sleeve 5.

The inner thread 8 is shown as passing through the entire leg section 2. It is to be appreciated, however, that for the purpose of the present invention it will suffice if a similar threaded portion 8 is only arranged at both ends of the leg section 2.

The connection between the two leg sections 2, 3 is established by another embodiment of a joint of the present invention. The joint comprises two generally cylindrical sleeves 15, 16, the outer surfaces of which are provided with a thread similar to the outer thread 7 of sleeve 5. It will be seen that the thread of the upper sleeve 15 is arranged to be received in the inner thread 8 of the section 2, while the outer thread of sleeve 16 is received in an inner thread 17 of section 3. The sleeves 15, 16 are pivotally secured to shank means of a bolt 18 passing therethrough and provided, at one end thereof, with a nut 19. The head of the bolt 18 and the nut 19, together with washers or the like prevent the sleeves 15, 16 from axial displacement with respect to the bolt 18. It will thus be observed that the sleeves 15, 16 are coaxial with respect to each other and pivotal about the bolt 18. The tightening of nut 19 when producing the joint according to the present invention results in an axial force which, produces resistance to the pivotal movement of sleeves 15, 16 with respect to the bolt or shank means 18 and thus also with respect to each other. Consequently, the sleeves 15, 16 can be turned with respect to each other only on application of an extreme force. A washer 20 is interposed between the two sleeves 15, 16. The outer diameter of washer 20 is larger than that of the maximum diameter of the inner thread 17 or 30, so that the washer 20 which is made of a thin plastic material such as nylon, effectively stops the joint member once one of the sleeves 15, 16 has been screwed into its associate section 2 or 3. Thus, the joint member is effectively maintained in operative position.

Assuming now that the leg section 2 has already been fixed to the top 1 as described above, the next step of assembling the table leg is adding to the section 2 the subsequent leg section 3. This is achieved by first screwing into the lower portion of the inside thread 8 of section 2 the above described connector so that the sleeve 15 is inside the bottom portion of section 2. The sleeve 16 of course protrudes from the bottom face of section 2 and is ready to receive the inner thread 17 of section 3. Section 3 is now turned about the axis of sleeve 16 until an abutment relationship is established between sections 3 and 2. Such abutment relationship seldom results in the side surface 9 of section 2 being parallel with a side surface 21 of section 3. The proper alignment of surfaces 21, 9 can, however, easily be achieved by further turning of section 3 with respect to section 2 on establishing the firm abutment relationship between the two. This is made possible by the above described pivotal arrangement of sleeves 15, 16 with respect to each other. Consequently, even on assuming a tight abutment relationship between sections 3 and 2, the sections can be still turned further with respect to each other to align their side surfaces 9, 21.

Figure 2:
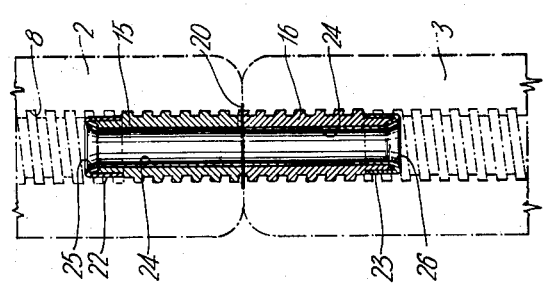
FIG. 2 is a longitudinal section of another embodiment of the joint member according to the present invention.

FIG. 2 shows another embodiment of the joint member employed between the sections 2 and 3. For the sake of clarity, the corresponding portions of the joint member shown in FIG. 2 are marked with the same reference numerals as in FIG. 1. The outer end portions of sleeves 15, 16 of the joint member of FIG. 2 are provided with protective sheet metal end sleeves 22, 23, respectively. The shank means of the joint member in this particular embodiment is a metal tube 24 made of mild steel. The ends of tube 24 are forged to form outwardly turned flanges 25, 26 which, by acting against the respective sheathing members 22, 23, press the sleeves 15, 16 against each other thus generating the resistance to pivotal movement of sleeves 15, 16 with respect to each other. This particular embodiment operates in the same way as the joint member between sections 3 and 2 in FIG. 1. However, the use of the outwardly flanged tube 24 results in the provision of a passage through the joint, thus rendering the joint suitable for use in lamp posts in which the electric cord has to pass through an assembled pole.

FIG. 5 shows the top portion of a decorative pole assembly which has further new and useful features additional to those of the above-noted joint member.

Figure 3:
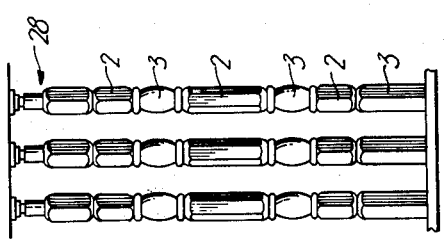
FIG. 3 is a side view of a decorative wall comprising pole assemblies, showing the surfaces of individual sections of each pole in aligned relationship.

It is to be appreciated that the bottom portion of the pole assembly (not shown) normally rests on the floor or the like and consists of a plurality of sections such as sections 2 and 3 shown in FIG. 1. The pole assembly produced by using the joint members of the present invention is rigid and thus cannot be bent in the way shown in U.S. Pat. No. 3,437,059 referred to hereinabove. In order to achieve appropriate fixing of such decorative pole assembly, e.g., between the floor and the ceiling, it is necessary to provide for certain adjustability of the overall length of the pole in order to be able to secure the pole in position wherein the bottom rests on the floor and the top presses against the ceiling of a room. This is achieved by providing a stud assembly 28, the lower portion of which includes a female member 29, the bottom portion of which is provided with an inner thread 30, similar to the bottom portion of thread 8 of section 2. The upper portion of the female member 29 has an enlarged opening 31 of circular cross section and located within the opening 31 is a male member 32 which is of a generally cylindrical shape. It will be observed that in the embodiment shown in FIG. 3, the inner thread 30 receives the upper sleeve 15 of a joint member similar to that of FIG. 2. Protruding inwardly from the inner thread 30 is a stud member 33 which has an outer thread corresponding to the inner thread 30. The male member 32 is provided with a similar inner thread so that the male member 32 can be screwed onto the protruding portion of the stud member 33. It will thus be observed that by turning of the male member with respect to the stud member, the effective overall height stud assembly 28 and thus of the entire decorative pole assembly can easily be adjusted. The thread inside the male member 32 preferably passes throughout the entire male member. The stud member 33 is, in this particular embodiment, an elongated, unitary wooden member, but those skilled in the art will readily appreciate that by producing the top sleeve 15 of the joint member to be of substantially greater length than that of the sleeve 16, one can readily obtain another embodiment of the stud member 33 which would perform exactly the same function as that of the stud member 33 shown in FIG. 3. The male member 32 is provided with an end cap 34.

Figure 6:
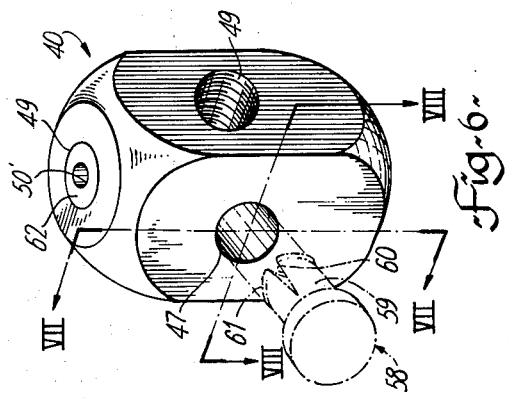
FIG. 6 is a perspective view of a cross-piece of a knock-down furniture for use with different embodiments of the joint of the present invention.

FIGS. 6 to 10 show the use of a still further embodiment of the present invention, particularly suitable for use in cross-pieces 40, 41 (FIGS. 6, 9, respectively). As will be readily appreciated from FIG. 9, the cross-piece 41 or 40 is arranged to be connected to a plurality of objects such as sections 42, 43, 44 and 45. Thus, from the standpoint of the present invention, the cross-member 41 and the sections 42 – 45 are similar to leg sections 2, 3 of FIG. 2. The cross-member 41 can therefore be referred to as a first object, the sections 42 – 45 then presenting four second objects. The purpose of the cross-members 40, 41 is to maintain the sections 42 – 45 at an angularly spaced relationship. In the embodiments shown, the angle is 90° and the second objects are arranged either in a single plane (FIG. 9) or in a plurality of planes (FIG. 6).

The cross-pieces 40, 41 have certain parts in common such parts therefore being referred to with the same reference numerals.

Each of the cross-pieces has a central hollow 46 and a plurality of openings 47, 49, 50, 51. It will be observed that the cross-piece of FIGS. 6 – 8 has three different types of the openings 47, 49, 50, the cross-piece 41 of FIGS. 9 and 10 only having two types of such openings 49, 50.

The openings 47 – 50 of each cross-piece are arranged in pairs. The two openings of a pair are typical by co-axial and axially spaced relationship. Thus, the cross-piece of FIGS. 6 – 8 has three such pairs, namely two openings 49 (top and bottom of FIG. 7), 47–50 and 49–50 (FIG. 8). On the other hand, the cross-piece 41 of FIGS. 9 and 10 only has two pairs of co-axial openings 49 – 50, the axes of such pairs crossing in the central hollow 46.

The embodiment of the cross-piece shown in FIG. 6 and 9 has certain features arranged for use with a still further embodiment of a joint member or connector according to the present invention, wherein the sleeve 52 (FIG. 10) is provided at its one end with a nut 53 (bottom right of FIG. 10) which is fixedly secured to the sleeve 52 by an end sleeve 54. The sleeve 52 thus in effect has an inner thread (of the nut 53) which is arranged to receive an outer thread 55 provided at the free end of the stem 56 of a screw, the stem passing through the opening 50 with the head 57 located inside the hollow 46. The stem 56, also referred to as shank means (as its function is the same as that of the wood screw 4, of the bolt 18 or of the tube 24 referred to hereinbefore) thus protrudes from the associated part of the cross-piece surface. As the head 57 is of a diameter greater than the inside diameter of the opening 50, it obviously limits the axial displacement of stem 56 in the direction of protruding of same from the cross-piece 41. Thus, the stem 56 is capable of securing the sleeve 52 to the cross-piece on screwing and tighting of the outer thread 55 into the nut 53.

It will thus be appreciated that the inside diameter of the opening 50 is only slightly greater than the outside diameter of the shank means or stem 56. If one considers the opening 50 to be the first opening 50 of a pair of co-axial openings, then the second openings 47 or 49 of such pair (FIG. 8) has the inside diameter considerably greater than the first opening, thus providing an easy access for insertion of a screwdriver for turning the head 57 to tighten the sleeve 52 to the cross-piece.

The second opening shown at the bottom of FIG. 8 is a plane opening 47 adapted to receive a wooden plug 58 (FIG. 6) the outside diameter of the stem 59 of which fits snugly into the opening 47. The stem 59 is provided with a wedge-shaped recess 60 which renders the stem 59 resilient. The free end of the stem 59 is provided with an annular ridge 61. The axial length of the stem is selected such that when the plug is fully inserted in opening 47, the ridge 61 reaches just beyond the inside end of the opening 47, into the hollow 46 to axially secure the plug in the opening 47. The recess 60 provides the plug 59 with a resiliency required for temporary contraction of the stem diameter during the insertion of the plug, while the ridge 61 is in contact with the inside cylindrical wall of the opening 47.

Those skilled in the art will readily appreciate that the ridge 61 can also be arranged to engage the inner thread of the opening 49 thus making the plug 58 more universal in selection of the opening with which it is to be used.

Turning now to the horizontally extending pair of the openings 49, 50 of FIG. 8, it will be seen that the opening 49 having the greater diameter can also be of the type of an internally threaded opening 49 the thread of which corresponds to that of the thread of the sleeve 52, 16, 15 or 5.

Referring to FIG. 10, it will be seen that each of the two openings 49 receives the sleeve 16 of the joint member as shown in FIG. 10, while the sleeve 15 of same is received in the threaded opening of section 44 or 45.

Figure 7:
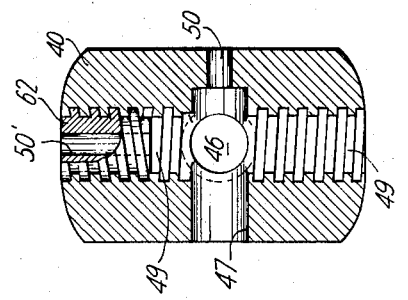
FIG. 7 is section VII—VII of FIG. 6.
Figure 8:
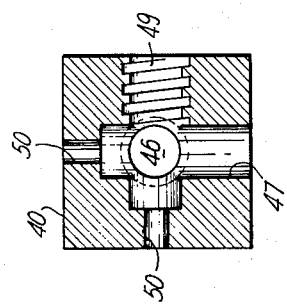
FIG. 8 is section VIII—VIII of FIG. 6.

When comparing the vertically extending pair of openings 49, 49 of FIG. 7 with the horizontal pair 49 – 50 of FIG. 8, it will be observed that the former pair 49 – 49 shows another embodiment of means defining the small diameter opening 50' with, namely a wooden sleeve 62 screwed into the upper opening 49 of FIG. 7, whereas the means for defining the opening 50 in FIG. 8 is actually the wall between the hollow 46 and the outside of the cross-piece 40. Obviously, the provision of sleeve 62 is of advantage as it enables that during the production of the cross-piece 40, 41, all openings can be machined uniform and provided with the internal thread to reduce the production cost of same.

It is to be appreciated that it is possible to depart from the above embodiments to a greater or lesser degree, without departing from the actual scope of the invention. Thus, although the sleeves 5, 15, 16 are preferably made of hardwood, with the sections 2, 3, 1 also being of wood, a substitution of any of the materials by another suitable material does not depart from the invention. Similarly, embodiments of the joint member can be produced without the central washer 20. The members 2, 3 shown in the accompanying drawings are all arranged in co-axial relationship. It is to be appreciated, however, that the present invention is no less suitable for application with cross-pieces whereby another set of sections similar to sections 2 and 3 can be arranged to extend perpendicularly to the axis of sections 2, 3. Such cross members per se are well known in the art and therefore do not have to be described in greater detail. The sections 2 and 3 shown in the drawings are of rectangular cross section but it is to be appreciated that the cross-section of these members is not essential at all. Indeed, the present invention can be used with members having circular cross-section as well, as it was found that the joint obtained by the joint member of the present invention not only allows for the above alignment of planar surface portions of adjacent members but also provides for a surprisingly strong joint. Therefore, the aforementioned departures from the discussed embodiments and many other modifications still fall within the scope of the present invention as defined in the accompanying claims.

The embodiments of the invention in which an exclusive property or privilege is claimed are defined as follows:

1. Elements for knock-down type furniture comprising a first element having an elongated body of symmetrical cross-section with planar side surfaces and two flat end surfaces, a second element having an elongated body with two flat end surfaces and a generally symmetrical cross-section adjacent at least one end thereof with planar side surfaces, the flat end surfaces of both elements being perpendicular to the axes of their respective elements;

means for interconnecting said elements in an end-to-end relationship so that the side planar surfaces of the first element are in a desired alignment with the side planar surfaces of the second element, said means comprising:

a. a bore extending through the medial portion of the first element, said bore having an unthreaded opening through one flat end surface thereof and a larger diameter opening through the other flat end surface thereof, the larger diameter opening having internal threads of truncated profile;

b. an opening in each flat end of the second element, each opening having internal threads of truncated profile;

c. a coupling means between said first and second elements comprising a sleeve having external truncated threads of a diameter less than that of the internal truncated threads of the second element and loosely threaded into one end of the second element so as to have no diametrical interference fit, said sleeve having an internal machine-screw thread, a machine-screw extending through the small diameter unthreaded opening of the first element and threaded into the machine screw threads of the sleeve, the flat ends of the end-to-end connected elements being adapted to be held in tight frictionally abutted relationship by said coupling means while the side planar surfaces of both elements can be aligned in the desired fashion prior to final tightening of the machine screw.

2. The elements of claim 1 in which the ratio of the maximum external diameter of the sleeve to the minimum external diameter of its flat end surface is at least 2:1.

3. Elements for knock-down type furniture comprising a first element having an elongated body of symmetrical cross-section with planar side surfaces and two flat end surfaces, a second element having an elongated body with two flat end surfaces and a generally symmetrical cross-section adjacent at least one end thereof with planar side surfaces, the flat end surfaces of both elements being perpendicular to the axes of their respective elements;

means for interconnecting said elements in an end-to-end relationship so that the side planar surfaces of the first element are in a desired alignment with the side planar surfaces of the second element, said means comprising:

a. a bore extending through the medial portion of the first element, said bore having an unthreaded opening through one flat end surface thereof and a larger diameter opening through the other flat end surface thereof, the larger diameter opening having internal threads of truncated profile;

b. an opening in each flat end of the second element, each opening having internal threads of truncated profile;

c. a coupling member between said first and second elements having external truncated threads of a diameter less than that of the internal threads and loosely threaded therein so as to have no diametrical interference fit, said coupling member having two axially aligned similarly threaded portions rotatably mounted on a shaft with relatively high friction therebetween so that they are in fixed axial relationship but can be forcibly rotated relative to each other to obtain desired alignment of the planar surfaces of the elements in end-to-end relationship.

4. The elements of claim 3 in which there is thin washer between the two axially aligned threaded portions of the coupling member.

* * * * *